Sept. 16, 1969   E. M. BOLOTIN ET AL   3,467,437
DEVICE FOR LOADING GROUND IN A MECHANIZED DRIFTING SHIELD
Filed March 1, 1967
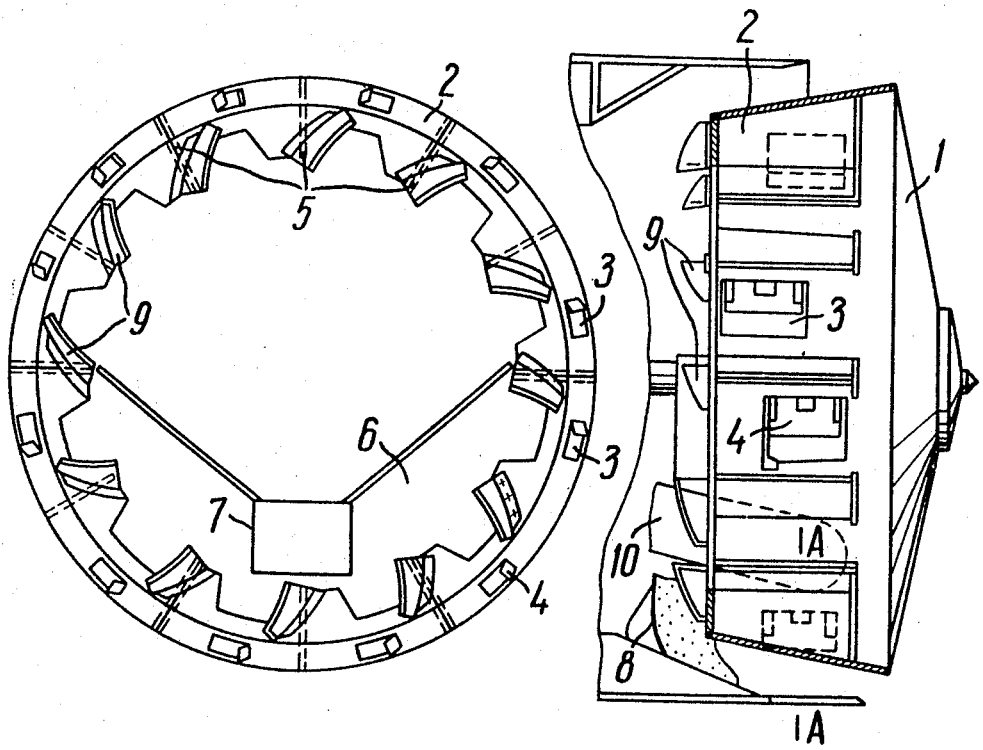
INVENTORS
E. M. BOLOTIN ET AL
By Blalock, Downing & Seebold
ATTORNEYS

United States Patent Office 3,467,437
Patented Sept. 16, 1969

3,467,437
DEVICE FOR LOADING GROUND IN A MECHANIZED DRIFTING SHIELD
Evgeny Moiseevich Bolotin, Otkrytoe shosse 24, korp. 25, kv. 12; Lev Abramovich Blyakher, Posledny per. 1/22, kv. 6; Boris Nikolaevich Ierusalimsky, Otkrytoe shosse 24, korp. 5-a, kv. 45; Leonid Ivanovich Saveliev, Otkrytoe shosse 29, korp. 11, kv. 58; Vladimir Ivanovich Razmerov, Leningradsky prospekt 62, kv. 90; and Leonid Konstantinovich Khaidurov, Otkrytoe shosse 24, korp. 5-g, kv. 31, all of Moscow, U.S.S.R.
Filed Mar. 1, 1967, Ser. No. 619,627
Int. Cl. E21d *13/04;* E21c *35/20, 27/30*
U.S. Cl. 299—33                                              1 Claim

ABSTRACT OF THE DISCLOSURE

A device for loading loose soil into a mechanized drifting shield in which a drum is fixed to the rear end part of a rotary working member, the drum is provided with holes inside the side wall through which knives protrude for collecting the soil and inner radial projections constituting buckets for transferring the soil. The rear part of the drum supports blades for delivering the loose soil retained by a dumping member arranged between the body of the shield and the rotary working member in the lower part thereof.

---

The present invention relates to a device employed in drifting shields for the disposal of earth or soil.

Known in the art are drifting shields in which the device for loading earth removed by a working member is constituted by rotating baskets arranged directly behind the working member. The application of loading devices of such a type in sticky grounds is hindered, as it is impossible to effect the mechanized cleaning of baskets.

This disadvantage has been eliminated in loading devices defined by a rotating drum in the form of a truncated cone whose side wall is provided with holes having knives protruding therefrom, with the knives being designed for collecting soil in the lower part of the shield and directing the thus collected soil through the holes into the drum where the soil is arrested by partitions secured on the side wall thereof and transferred into a bin fixed within the drum. From this bin the soil passes onto a conveyor and therefrom into suitable transport means.

In this situation, however, a great deal of the soil passing under the working member and escaping the loading device enters into the shield and causes a choking of the conveyor, thereby reducing the capacity of the shield in transporting the removed soil.

The principal object of the present invention is to eliminate such disadvantage by providing the drum of the loading device with share-type blades arranged in the rear part thereof, and by installing in the lower part of the shield, in the direction of the ground travel, a dumping member for retaining the soil transferred by the aid of the blades into the drum.

The invention will become more fully apparent to one skilled in the art from a consideration of the following description of an exemplary embodiment thereof, taken in conjunction with the appended drawings, in which:

FIG. 1 is a side elevational view of the loading device attached to the working member complete with a dumping member disposed in the lower part of the drifting shield;

FIG. 2 is a rear elevational view of the loading device; and

FIG. 3 is a view taken along the line A—A of FIG. 1.

The loading device attached to a rotary working member 1 (FIGS. 1 and 2) comprises a drum 2 in the form of a truncated cone provided with holes 3 in the side wall thereof. Secured to the drum 2 are knives 4 (FIG. 3) which may be adjusted lengthwise, and which protrude from the holes 3 in the direction of rotation of the working member 1. The knives serve for collecting loose soil in the lower part of the shield and directing the soil into the drum 2 through the holes 3.

The soil entering the rotary drum 2 is arrested by partitions 5 (FIG. 2) radially attached to the side wall of the drum and transferred along guides 6 into a bin 7 fixed within the drum 2 of the loading device.

The soil, which is not removed by the knives 4, collects between the drum 2 and the lower part of the shield, and is retained in such zone by a dumping member 8 (FIG. 1). The loading of the soil accumulated in front of the dumping member 8 is effected by the aid of share-type blades 9 (FIG. 1) disposed in the rear part of the drum 2 and designed to direct the soil into the drum. The ground entering the bin 7 is transferred therefrom by a conveyor 10 into transporting means (not shown).

This invention improves the loading of the soil removed by the shield, and augments its efficiency due to an increase in the delivery capacity thereof.

We claim:

1. In a device for loading loose soil into a mechanized drifting shield, said device comprising a rotatable working member for the shield, a drum attached to said working member and provided with holes in the side wall thereof for receiving the soil, knives for collecting loose soil in the lower part of said shield secured on said drum, said knives protruding from the holes in the direction of rotation of the working member, a bin for storing and transferring soil fixed within said drum, radial partitions located within said drum and attached to the side wall thereof, said partitions serving for transferring the soil into said bin during drum rotation, a dumping member arranged in the lower part of said shield for retaining the soil passing under said working member, and share-type blades mounted in the rear part of said drum and serving for transferring the soil accumulating in front of said dumping member into said drum.

References Cited
UNITED STATES PATENTS

| | | | |
|---|---|---|---|
| 741,829 | 10/1903 | Price | 299—56 |
| 1,326,480 | 12/1919 | Dana | 299—86 X |
| 2,182,477 | 12/1939 | Hollingsworth | 299—58 X |
| 3,075,591 | 1/1963 | Pirrie et al. | 299—56 X |

ERNEST R. PURSER, Primary Examiner

U.S. Cl. X.R.
299—56, 90